(12) United States Patent
Bayer et al.

(10) Patent No.: US 11,970,836 B2
(45) Date of Patent: Apr. 30, 2024

(54) ELECTRIC ENERGY TRANSFER SYSTEM FOR AN EXCAVATOR

(71) Applicant: Liebherr-Hydraulikbagger GmbH, Kirchdorf/Iller (DE)

(72) Inventors: Daniel Bayer, Giengen (DE); Dirk Asam, Ulm (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 306 days.

(21) Appl. No.: 17/200,015

(22) Filed: Mar. 12, 2021

(65) Prior Publication Data

US 2021/0301497 A1 Sep. 30, 2021

(30) Foreign Application Priority Data

Mar. 31, 2020 (DE) ...................... 10 2020 108 856.6

(51) Int. Cl.
*B60L 50/60* (2019.01)
*B60L 1/00* (2006.01)
*B60L 1/02* (2006.01)
*B60L 50/40* (2019.01)
*E02F 9/02* (2006.01)
*E02F 9/12* (2006.01)
*E02F 9/18* (2006.01)
*E02F 9/20* (2006.01)

(52) U.S. Cl.
CPC ........ *E02F 9/20* (2013.01); *B60L 1/00* (2013.01); *B60L 1/02* (2013.01); *B60L 50/40* (2019.02); *B60L 50/66* (2019.02); *E02F 9/02* (2013.01); *E02F 9/123* (2013.01); *E02F 9/18* (2013.01); *B60L 2200/40* (2013.01)

(58) Field of Classification Search
CPC ....... E02F 9/20; E02F 9/02; E02F 9/123; E02F 9/18; B60L 1/00; B60L 1/02; B60L 50/40; B60L 50/66; B60L 2200/40
See application file for complete search history.

(56) References Cited

U.S. PATENT DOCUMENTS

| 10,352,023 | B2 | 7/2019 | Frank et al. |
| 2004/0148817 | A1* | 8/2004 | Kagoshima ............ B60L 58/25 37/348 |
| 2013/0258811 | A1* | 10/2013 | Guigne ............... G01S 15/8904 367/88 |

(Continued)

FOREIGN PATENT DOCUMENTS

| CN | 104247196 A | 12/2014 |
| CN | 105569102 A | 5/2016 |

(Continued)

*Primary Examiner* — Jason D Shanske
*Assistant Examiner* — James J Triggs
(74) *Attorney, Agent, or Firm* — Dilworth & Barrese, LLP

(57) ABSTRACT

The present invention relates to a mobile work machine, in particular to an excavator, that comprises an undercarriage having a tracked chassis, a rail mounting, or a wheeled chassis, a superstructure having an attachment fastened thereto, and a slewing ring that rotatably connects the undercarriage and the superstructure to one another. The work machine is characterized by a decentralized energy supply and/or by a decentralized supply network, preferably a DC supply network, and a slip ring for transferring electrical energy between the superstructure and the undercarriage.

16 Claims, 4 Drawing Sheets

(56) References Cited

U.S. PATENT DOCUMENTS

2014/0214250 A1* 7/2014 Murakami .............. B60L 53/55
    701/22
2021/0002111 A1* 1/2021 Rushton ................ B66F 9/0655

FOREIGN PATENT DOCUMENTS

| | | | |
|---|---|---|---|
| CN | 105569104 A | 5/2016 | |
| CN | 105569105 A | 5/2016 | |
| CN | 105569110 A | 5/2016 | |
| CN | 106536828 A | 3/2017 | |
| DE | 19948831 A1 | 4/2001 | |
| DE | 102018206403 A1 | 10/2019 | |
| EP | 1985767 A1 | 10/2008 | |
| EP | 2460941 A1 | 6/2012 | |
| JP | 2001-12404 A | 1/2001 | |
| JP | 2012-201187 A | 10/2012 | |

* cited by examiner

ELECTRIC ENERGY TRANSFER SYSTEM FOR AN EXCAVATOR

BACKGROUND OF THE INVENTION

The present invention relates to a mobile work machine, in particular to a fully electrically operated mobile work machine such as an excavator.

It is known that mobile work machines can be used both in earthworks and for purposes of material transfer. A very predominant number of these machines is here equipped with a conventional internal combustion engine that is operated with fossil fuels.

There are, however, also so-called semistationary power supply operated work machines. This technology is primarily used in work machines that are used for material transfer since this work is performed over a very concentrated area. It is thus provided that the work machine is permanently connected to a stationary electric power network in the expected area of work. This can be implemented, for example, via an installed high voltage line or corresponding equivalent devices.

It is disadvantageous that when selecting between the above-presented alternatives, a decision always has to be made between mobility and the electric drive with the associated local freedom from emissions.

Fully electric mobile work machines have not yet been able to establish themselves on the market to date since the high and energy-intensive work demands of the work machines can frequently not be served over a sufficiently long period of time. However, as the development of energy stores progresses and also due to regulatory demands, it is assumed that fully electric work machines will be demanded in the future.

SUMMARY OF THE INVENTION

It is here the goal of the present invention to provide an improved mobile work machine that is, on the one hand, characterized by a reduction of the required primary energy requirements that is a large as possible and, on the other hand, permits an optimum arrangement of energy stores.

This is done using a mobile work machine that has all the features herein. Advantageous aspects of the device are also described herein.

Provision is made in accordance with the invention that the mobile work machine, in particular an excavator, comprises an undercarriage having a tracked chassis, a rail mounting, or a wheeled chassis, a superstructure having an attachment fastened thereto, and a slewing ring that rotatably connects the undercarriage and the superstructure to one another. The work machine is characterized by a decentralized energy supply and/or by a decentralized supply network, preferably a DC supply network (DC bus), and a slip ring for transferring electrical energy between the superstructure and the undercarriage.

It is accordingly possible by the provision of the slip ring not to restrict the energy store and the drive systems only to the superstructure since components arranged at the undercarriage can now also be integrated by the conducting of the energy by the slip ring. It is now possible, for example, to provide decentralized energy stores that can be arranged both at the superstructure and at the undercarriage.

For example, with the idea in accordance with the invention, the supply network can also be continued in the undercarriage so that various components and drive systems can also be supplied with energy there.

Provision can thus be made in accordance with the invention that a part of the supply network extends in the superstructure and an electric connection to the undercarriage is implemented via the slip ring so that it can be continued in the undercarriage.

The slip ring is advantageously configured such that it also serves as a power distribution box. This means that the slip ring serves as a central element and the connection lines to the energy stores, that are arranged in a decentralized manner and that can be distributed over the superstructure and the undercarriage, can all have approximately the same line resistances (provision can thus be made that the line resistances can vary in a range of 5% around the largest line resistance). The balancing between the energy stores arranged in a decentralized manner can hereby be reduced to a minimum. It is advantageous here that the rechargeable batteries can be discharged, which results in a reduction of the transfer losses and of the thermal load of the components and ultimately in a reduction of the primary energy requirements of the components.

The transfer resistance of the brushes of the slip ring can advantageously be compensated by adapting the line cross-section or line lengths.

Provision can furthermore be made in accordance with the invention that the arrangement of the brushes and rings is adapted such that the transfer resistances at the brushes to the superstructure and undercarriage components are identical. This could, for example, be implemented in that at the superstructure side the connection cable of the HV positive line is led to a brush and the HV negative line is led to the ring. The connection would then be reversed at the undercarriage side.

It is likewise possible in accordance with the invention that an energy store electrically connected to the supply network is designed in decentralized form in a plurality of energy storage units. Each of the energy storage units is here connected to the supply network so that consumers likewise connected thereto can obtain their energy from the energy storage units. A modular design of the energy storage units ensures that it can be cascaded in accordance with the work tasks to be performed.

Provision can be made in accordance with an optional modification of the invention that one or more of the energy storage units are arranged in the undercarriage and one or more other ones of the energy storage units are arranged in the superstructure and an energy storage unit in the undercarriage is e.g. fastened to the fastening apparatus for attaching a snow blade in addition to or instead of the dozer blade.

The attachment of an energy storage unit in the region of a normally present dozer blade of an excavator or of a mobile work machine is in particular of advantage here since such an energy storage unit can be replaced without great effort. An energy storage unit could thus be simply placed onto the ground since the mobile work machine can move to it on its own and take up the energy store and can connect to the supply network by means of the adjustable fastening device that is actually provided for the dozer blade.

The rechargeable battery capacity can also be correspondingly increased by the attachment of energy storage units between the axles or at the front and back (e.g. outrigger boxes). A replacement of the rechargeable batteries would then have to be ensured via corresponding auxiliary devices or additional vehicles, e.g. a forklift.

Provision can furthermore be made in accordance with the invention that one of the energy storage units is attached to the superstructure at a side disposed opposite the attachment to serve as an energy store and ballast.

An excavator typically has a ballast weight at its side opposite the attachment (excavator boom) to ensure sufficient payload and stability.

Provision can additionally be made in accordance with the invention that the energy store is scalable in its capacity by connecting energy storage units to the supply network. If it is, for example, foreseeable that the energy store located at the superstructure is too small in capacity for a provided task, it can be variably expanded in that further energy storage units are connected to the supply network.

Provision can be made in accordance with a further modification of the invention that the slewing gear is actuable by an electrical slewing gear drive that obtains its energy via the supply network to perform a slewing movement of the superstructure with respect to the undercarriage.

Provision can further be made in accordance with an advantageous further development of the invention that the work machine is furthermore provided with a power store that is connected to the supply network. The energy buffer is preferably configured in the form of capacitors, so-called supercaps. Such a power store is in particular of advantage when high power peaks have to be buffered in a short time and/or with a high number of cycles.

The power store can be designed as central or decentralized. With a decentralized design, a power store has to be provided for every recuperable system in extreme cases.

If the power store is designed as central, all the recuperable systems are only buffered via one store in extreme cases. This also makes it possible under economic aspects to use small power peaks or power peaks that only rarely occur.

If the power stores are arranged in decentralized form, the recuperating energy packs of the part systems do not strain or influence any other systems. This means that no power, current, or voltage peaks result on the distribution network on the device side. The charging and discharging strategy of the stores can be optimally designed due to the decentralized arrangement of the power stores. The system thereby becomes stable and only small fluctuations occur in the supply network.

Provision can further be made in accordance with the invention that the work machine is provided with an electrical traction drive that obtains its energy via the supply network. The traction drive can here have additional energy or power stores and suitable devices to adapt the motor speed. Provision can be made here that the electrical traction drive is arranged in the undercarriage..

Provision can further be made in accordance with the invention that the work machine is provided with at least one electric drive for the actuation of the work device, wherein the at least one electric drive obtains its energy over the supply network. The drive of the hydraulic units can here have additional energy or power stores and suitable devices to adapt the motor speed. Provision can be made here that the electric drive for the actuation of the work device is arranged in the superstructure.

Provision can further be made in accordance with the invention that the work machine is provided with an electric slewing drive that obtains its energy via the supply network. The superstructure can be pivoted with respect to the undercarriage via the slewing drive. The slewing drive can here have additional energy or power stores and suitable devices to adapt the motor speed.

Provision can furthermore be made in accordance with the invention that the work machine is provided with at least one electric subsystem that obtains its energy over the supply network, with the systems for the operator workplace air conditioning, the oil temperature control, the cooling water temperature control, or the cooling water climate control and for the ventilation being directly connected to the supply network. The use of waste heat can here be implemented in an efficient manner, which results in improved thermal management of the work machine.

To raise further potential for savings, the systems for the support, steering, and braking of the vehicle can have independent drives or actuators connected to the supply network.

For economic and technical reasons (dimensions, parts availability), it is necessary to provide different voltage levels on the device. DC/DC converters can be used to adapt the voltage level.

To be able to use additional energy storage units that have a different charge state than the base device (base rechargeable battery), the voltage levels have to be adapted. This is e.g. possible by so-called DC/DC converters. Additional rechargeable batteries or energy sources can hereby be connected to the base device even when the energy store therein is depleted without the existing energy stores first having to be charged.

To avoid transfer currents or to keep them as small as possible, it may be meaningful to take the base rechargeable battery from the supply network by a DC/DC converter or a switching off device. Once the rechargeable batteries or energy sources have reached the same or very similar charge states, the base rechargeable battery can be connected to the supply network again and can be further used.

BRIEF DESCRIPTION OF THE DRAWINGS

Further features, details and advantages of the invention will be explained with reference to the following description of the Figures. There are shown.

DESCRIPTION OF THE PREFERRED EMBODIMENTS

Figure 1:
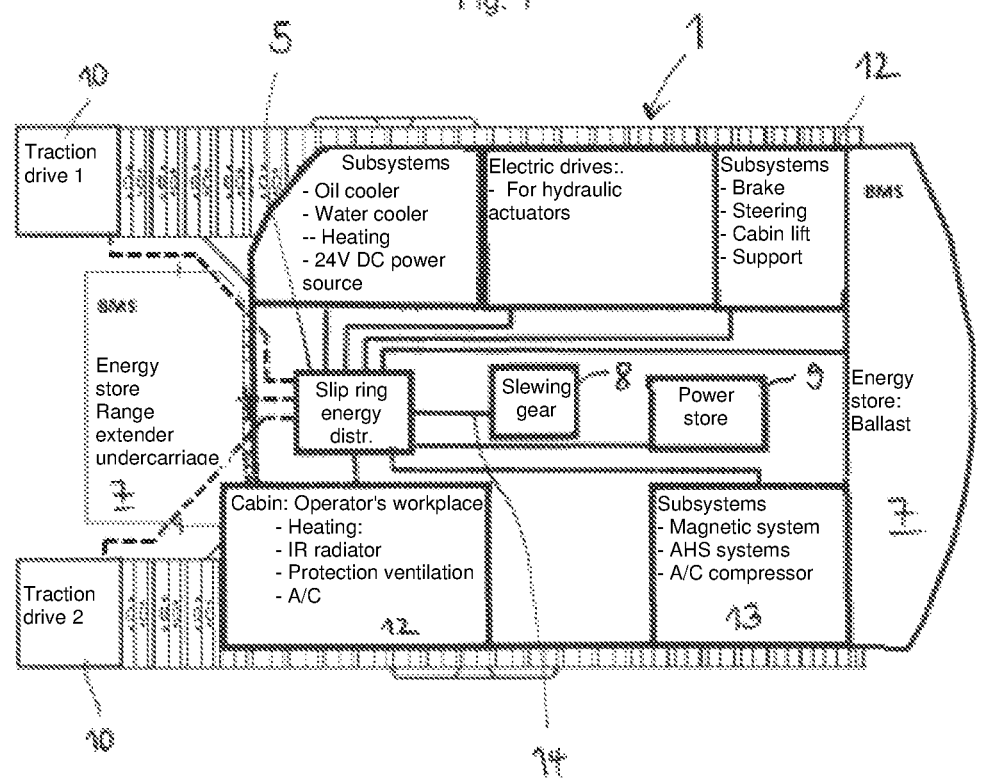
FIG. 1: a schematic basic design of the work device in accordance with the invention.

FIG. 1 shows a schematic basic design of a work machine 1 in accordance with the invention. The centrally arranged cross point represents the slip ring 5 here, that is the rotatable electric connection of the superstructure and the undercarriage. The supply network 6 starting from here is characterized on the one hand by a continuous line that represents the course of the supply network 6 in the superstructure. The dotted line starting from the slip ring is here representative of the extent of the supply network 6 in the undercarriage. It can be recognized that components both in the undercarriage and in the superstructure are connected to the supply network 6 and the supply network 6 extends through the slip ring 5.

In the present case, an energy storage unit 7 and also a traction drive 10 are provided in the undercarriage and are each connected to the supply network 6. The traction drive 10 arranged in the undercarriage, however, does not obtain its energy only from the energy storage unit 7 that is arranged in the undercarriage (when present), but also from the energy storage unit 7 arranged in the superstructure (where present).

A slewing gear drive 8, e.g. an electric slewing gear drive 8, for rotating the superstructure 5 is furthermore arranged in the superstructure and obtains its energy via the supply network 6.

In addition, there are further electric consumers in the superstructure that are connected to the supply network 6. One or more electric drives 11 for the work hydraulics of the attachment of the work machine 1, for example an excavator arm or the like, are also connected to the supply network 6. An electric brake, a steering, a cabin lift, the support of the work machine (by means of outriggers and/or dozer blades) or also an oil cooler and optionally a water cooler can be considered as further consumers.

Devices such as the heating and air conditioning of the operator workplace can likewise be supplied with energy via the supply network 6. In an advantageous extension, the heating can take place by using waste heat of the drive components or of the energy stores. The efficiency of the air conditioning system could be further increased by the use of heat pumps and the use of primary energy could thus again be reduced.

The energy storage unit arranged in the superstructure is advantageously arranged at the side of the superstructure disposed opposite the attachment so that it also simultaneously acts as ballast and the ballast that is normally present is not required or only to a reduced degree.

It can furthermore be seen from FIG. 1 that a power store 9, a so-called supercap, is present in the superstructure that is adapted to take up a large amount of energy in a short time and to store it for a brief period (for example approximately 30 seconds up to 2 minutes). In an advantageous extension, it can be arranged as a central store for all the systems.

For example, the power store 9 cannot only be connected to the supply network 6, but also furthermore has a further respective connection 14 to the slewing gear drive 8 and to the drive or drives 11 for the attachment.

Figure 2A:
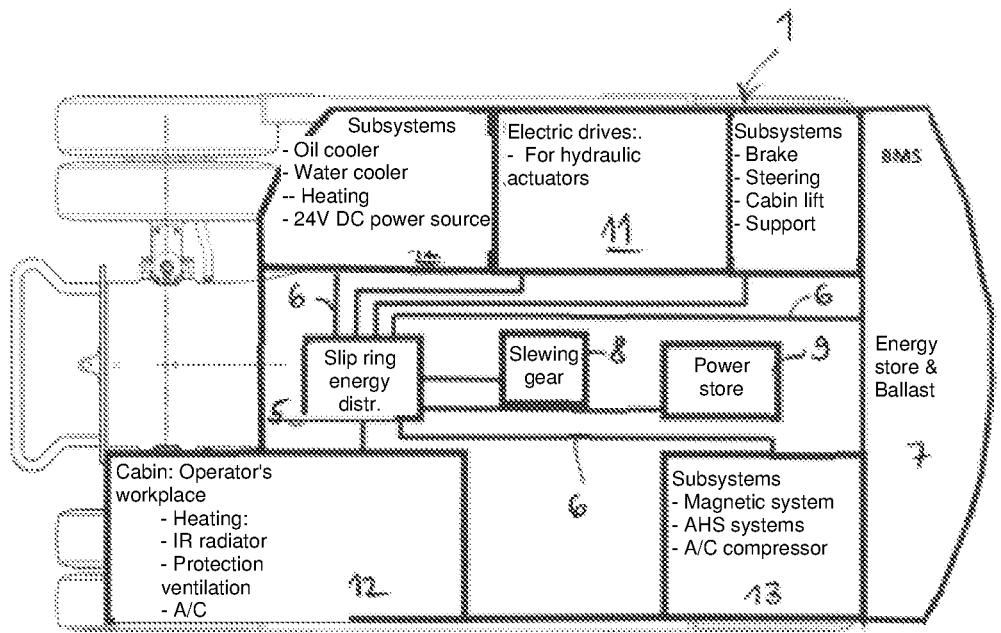
FIGS. 2a&b: a schematic view of the superstructure and undercarriage in which the slip ring is used as a power distribution unit.
Figure 2B:
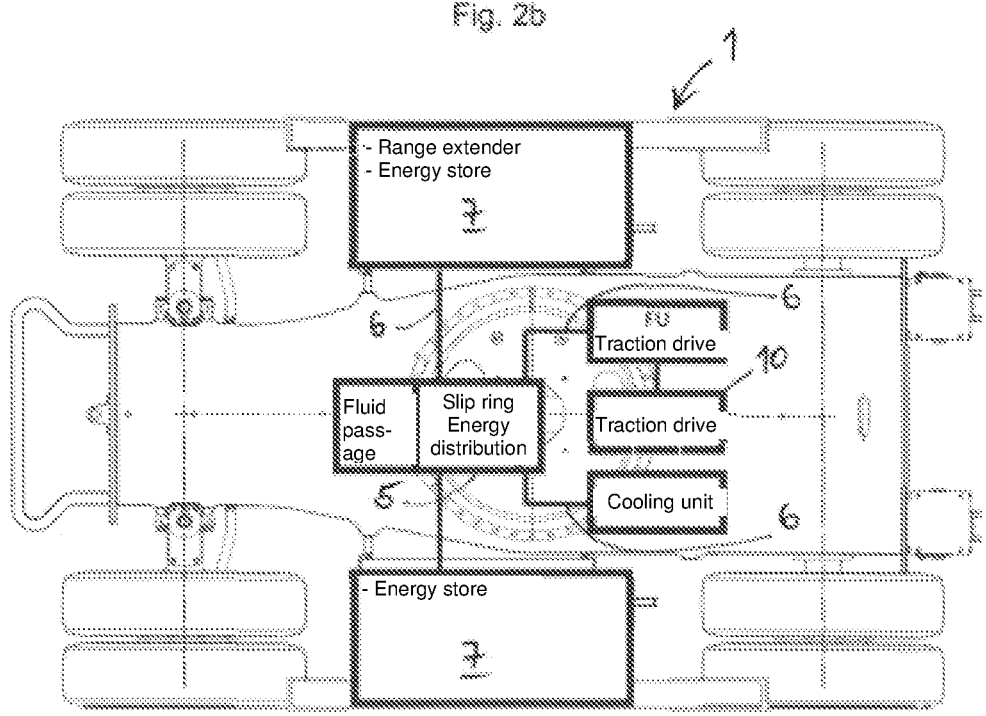

FIGS. 2a and 2b show a slightly modified variant of the schematic setup of the work machine 1 in which the electric components (e.g. FU) and energy store are connected to the supply network via the slip ring. The slip ring has a connection to at least one energy storage unit 7. The arrangement ensures that the power resistances between the energy storage units can be held in a tolerable range.

Figure 3:
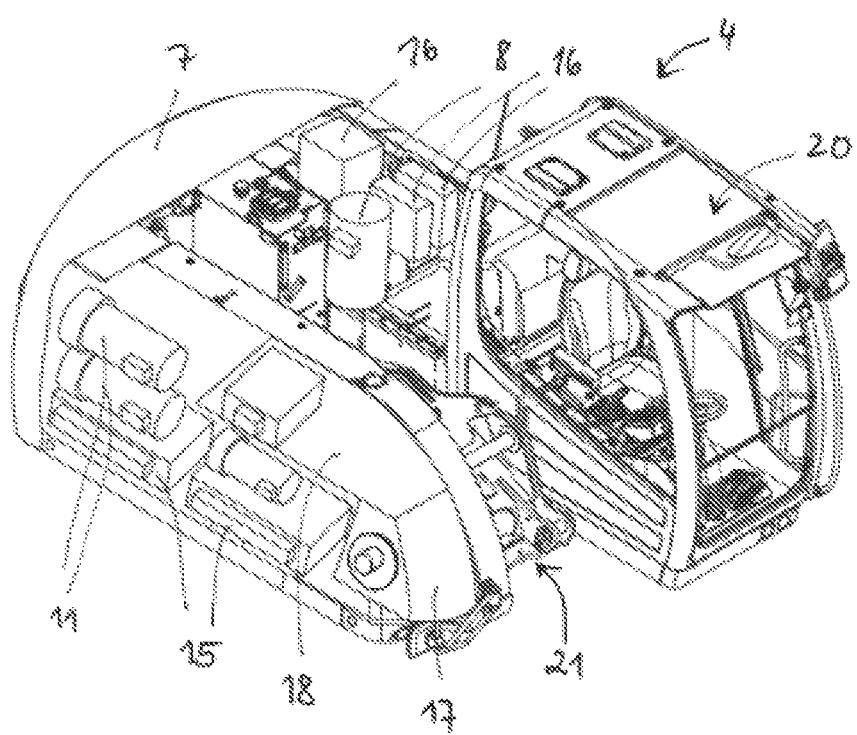
FIG. 3: a superstructure of a work machine in accordance with the invention.

FIG. 2a here shows the structural design in a superstructure of the mobile work machine, whereas FIG. 2b shows the structural design in an undercarriage of the work machine. FIG. 3 shows a superstructure 4 of an electric work machine, for example a battery-operated excavator. The individual electric consumers of the superstructure are shown schematically therein.

An operators cabin 20 can be recognized from where an operator can control the work machine. A connection section for an excavator arm or for a different attachment of the work machine that projects from a side of the superstructure is marked next to it by reference numeral 21.

Opposite exactly that side to which the attachment of the work machine is attached, an energy store 7 can be arranged that simultaneously due to its weight also serves as part of the ballast for the work machine.

In addition, the electric slewing gear drive 8, the drives 11 for the attachment, inverter units 15 for the electric drives, converter units 16 to generate onboard network voltages of 24 V, 48 V or AC 230/400 V, and the cooling and heating system 17 are present in the superstructure 4. An additional installation plane for further consumers is present with reference numeral 18.

Figure 4A:
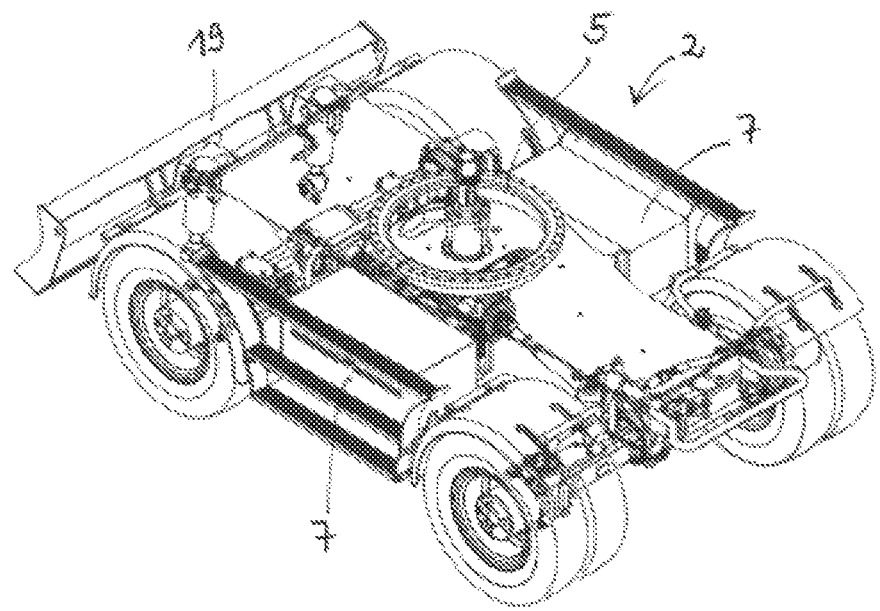
FIGS. 4a&b: an undercarriage of a work machine in accordance with the invention.

FIG. 4a shows a perspective view of an undercarriage 2, with the fluidic rotary union and the slip ring for transferring the control signals 5 being centrally installed. The range extender modules, charge modules, or plug-in modules, e.g. energy storage units 7, and the dozer blade 19 arranged at the front in the direction of travel arranged at the undercarriage 2 can furthermore be recognized.

Figure 4B:
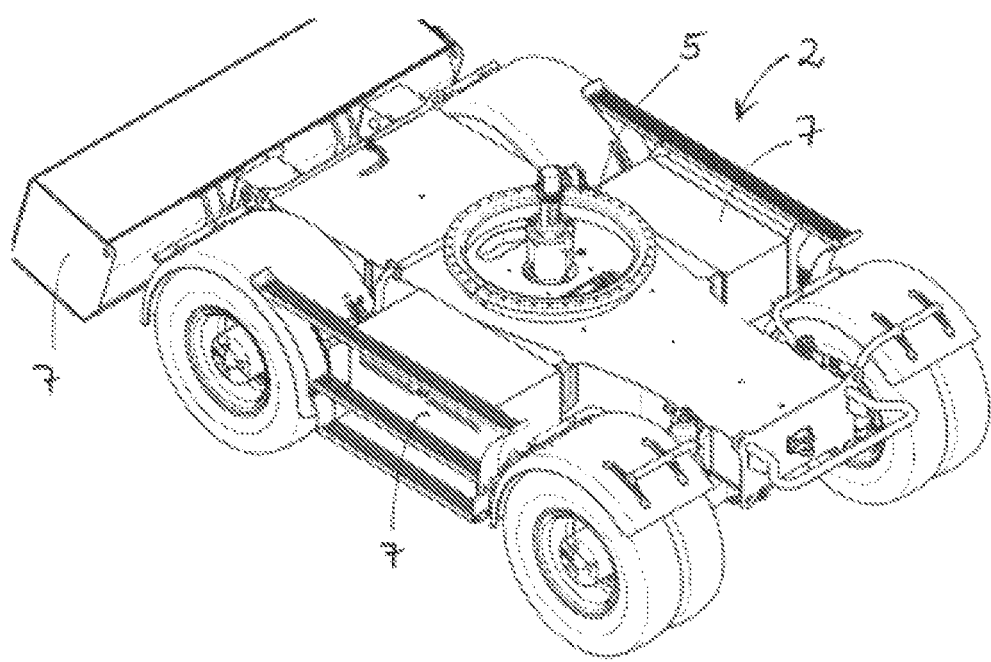

FIG. 4b shows the undercarriage 2 as it now presents a further energy storage device 7 that increases the available energy capacity instead of the dozer blade 19. This selectively connectable energy store 7 can therefore. Provision can be made here that the taking up of this energy storage unit takes place by means of the movement device that is also suitable to actuate the dozer blade. It is thus not necessary to raise the range extender energy storage unit by means of a crane or the like since the required lifting procedure away from the ground can take place by the actuation device for the dozer blade that is already present at the work machine (e.g. at the excavator).

The invention claimed is:

1. A mobile work machine (1), comprising:
   an undercarriage (2) having a tracked chassis, a rail mounting, or a wheeled chassis (3);
   a superstructure (4) having an attachment fastened thereto;
   a slewing ring (8) that rotatably connects the undercarriage (2) and the superstructure (4) to one another;
   a decentralized energy supply network (6) for supplying energy to actuate the mobile work machine (1);
   a slip ring (5) to transfer electric energy between the superstructure (4) and the undercarriage (2); and
   a plurality of energy store units (7),
   wherein one of the plurality of energy store units (7) which is connected to the slip ring (5), is configured in a decentralized manner.

2. The mobile work machine (1) in accordance with claim 1, wherein a part of the supply network extends in the superstructure (4) and an electric connection to the undercarriage (2) is implemented via the slip ring (5) so that the supply network (6) is continued in the undercarriage (2).

3. The mobile work machine (1) in accordance with claim 1, wherein an energy store is scalable in its capacity by connecting said plurality of energy store units (7) to the supply network (6).

4. The mobile work machine (1) in accordance with claim 1, wherein the slewing ring (8) of the mobile work machine is actuatable by an electrical slewing gear drive that obtains its energy via the supply network (6) to perform a slewing movement of the superstructure (4) with respect to the undercarriage (2).

5. The mobile work machine (1) in accordance with claim 1, further having a power store (9) that is connected to the supply network (6) and configured in the form of capacitors.

6. The mobile work machine (1) in accordance with claim 5, wherein the power store (9) is designed in a decentralized form, and a separate power store (9) is provided for a plurality of recuperable systems or for every recuperable system.

7. The mobile work machine (1) in accordance with claim 1, further having an electric traction drive (10) that is arranged in the undercarriage (2) and obtains its energy via the supply network (6).

8. The mobile work machine (1) in accordance with claim 1, further having at least one electric drive (11) for the actuation of the mobile work machine (1), wherein the at least one electric drive (11) obtains its energy via the supply network (6).

9. The mobile work machine (1) in accordance with claim 1, further having at least one electric subsystem (12) that obtains its energy via the supply network (6), with the at least one electric subsystem (12) being at least one of a hydraulic oil cooler, a heating climate control device, an emergency brake and a service brake, an undercarriage support system, a steering, and a cabin lift.

10. The mobile work machine (1) in accordance with claim 1, further having an electric traction drive (10) arranged in the undercarriage (2) and obtaining its energy via an energy distribution unit (13) connected to one of the plurality of energy store units (7).

11. The mobile work machine (1) in accordance with claim 1, further having at least one electric drive (11) for the actuation of the mobile work device (1), wherein the at least one electric drive (11) obtains its energy via an energy distribution unit (13) connected to one of the plurality of energy store units (7).

12. The mobile work making in accordance with claim 10, wherein the energy distribution unit (13) is connected to said one of the plurality of energy store units (7) arranged in the undercarriage (2).

13. The mobile work making in accordance with claim 11, wherein the energy distribution unit (13) is connected to said one of the plurality of energy store units (7) arranged in the superstructure (4).

14. A mobile work machine (1), comprising:
   an undercarriage (2) having a tracked chassis, a rail mounting, or a wheeled chassis (3);
   a superstructure (4) having an attachment fastened thereto;
   a slewing ring (8) that rotatably connects the undercarriage (2) and the superstructure (4) to one another;
   a decentralized energy supply network (6) for supplying energy to actuate the mobile work machine (1); and
   a slip ring (5) to transfer electric energy between the superstructure (4) and the undercarriage (2), wherein
   an energy storage unit (7) is arranged in the undercarriage (2); and
   a different energy storage unit (7) is arranged in the superstructure (4).

15. The mobile work machine (1) in accordance with claim 14, wherein the energy storage unit (7) arranged in the superstructure (4) is attached to the superstructure (4) at a side of the superstructure (4) to serve as a ballast.

16. A mobile work machine (1), comprising:
   an undercarriage (2) having a tracked chassis, a rail mounting, or a wheeled chassis (3);
   a superstructure (4) having an attachment fastened thereto;
   a slewing ring (8) that rotatably connects the undercarriage (2) and the superstructure (4) to one another;
   a decentralized energy supply network (6) for supplying energy to actuate the mobile work machine (1);
   a slip ring (5) to transfer electric energy between the superstructure (4) and the undercarriage (2); and
   at least one electric subsystem (12) that obtains its energy via an energy supply unit (13) connected to an energy store (7), with the at least one electric subsystem (12) being at least one of a hydraulic oil cooler, a heating climate control device, an emergency brake and a service brake, an undercarriage support system, a steering, and a cabin lift.

\* \* \* \* \*